US008830932B2

(12) United States Patent
Chen et al.

(10) Patent No.: US 8,830,932 B2
(45) Date of Patent: Sep. 9, 2014

(54) OBTAINING METHOD AND DEVICE FOR CHANNEL INFORMATION (75) Inventors: Yijian Chen, Guangdong (CN); Jun Xu, Guangdong (CN); Yu Ngok Li, Guangdong (CN); Junfeng Zhang, Guangdong (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 13/260,029

(22) PCT Filed: Oct. 19, 2010

(86) PCT No.: PCT/CN2010/077871
§ 371 (c)(1),
(2), (4) Date: Oct. 24, 2012

(87) PCT Pub. No.: WO2011/134245
PCT Pub. Date: Nov. 3, 2011

(65) Prior Publication Data
US 2013/0136065 A1    May 30, 2013

(30) Foreign Application Priority Data

Apr. 30, 2010   (CN) .......................... 2010 1 0174347

(51) Int. Cl.
| H04W 4/02 | (2009.01) |
| H04W 72/12 | (2009.01) |
| H04W 36/20 | (2009.01) |
| H04W 40/16 | (2009.01) |
| H04W 16/10 | (2009.01) |
| H04W 40/38 | (2009.01) |
| H04W 72/06 | (2009.01) |
| H04L 1/00 | (2006.01) |
| H04L 25/03 | (2006.01) |
| H04B 7/06 | (2006.01) |
| H04B 7/04 | (2006.01) |

(52) U.S. Cl.
CPC ............. *H04W 72/06* (2013.01); *H04B 7/0639* (2013.01); *H04L 1/0031* (2013.01); *H04B 7/0469* (2013.01); *H04B 7/0645* (2013.01); *H04L 25/03949* (2013.01); *H04B 7/0486* (2013.01); *H04B 7/063* (2013.01); *H04L 2025/03808* (2013.01); *H04B 7/0417* (2013.01); *H04L 25/03923* (2013.01); *H04B 7/0626* (2013.01)
USPC ............ 370/329; 370/341; 370/441; 370/479

(58) Field of Classification Search
CPC ... H04W 72/06; H04W 28/048; H04L 5/0082
See application file for complete search history.

(56) References Cited

U.S. PATENT DOCUMENTS

| 8,472,547 B2 * | 6/2013 | Hammarwall et al. ....... 375/267 |
| 2009/0190528 A1 | 7/2009 | Chung et al. |
| 2010/0322176 A1 * | 12/2010 | Chen et al. .................... 370/329 |
| 2011/0032839 A1 * | 2/2011 | Chen et al. .................... 370/252 |
| 2011/0305161 A1 * | 12/2011 | Ekpenyong et al. .......... 370/252 |
| 2013/0051490 A1 * | 2/2013 | Gupta et al. ................... 375/296 |
| 2013/0064128 A1 * | 3/2013 | Li et al. ......................... 370/252 |
| 2013/0070704 A1 * | 3/2013 | Lee et al. ....................... 370/329 |
| 2013/0077514 A1 * | 3/2013 | Dinan ............................ 370/252 |
| 2013/0089078 A1 * | 4/2013 | Liu et al. ....................... 370/335 |
| 2013/0114455 A1 * | 5/2013 | Yoo et al. ...................... 370/252 |
| 2013/0136203 A1 * | 5/2013 | Chen et al. .................... 375/285 |
| 2013/0188591 A1 * | 7/2013 | Ko et al. ........................ 370/329 |
| 2013/0188623 A1 * | 7/2013 | Chen et al. .................... 370/336 |

FOREIGN PATENT DOCUMENTS

| CN | 101400074 A | 4/2009 |
| CN | 101615979 A | 12/2009 |
| CN | 101626266 A | 1/2010 |
| JP | 2010068496 A | 3/2010 |
| JP | 2011009865 A | 1/2011 |
| JP | 2013516862 A | 5/2013 |

OTHER PUBLICATIONS

3GPP TS 36.211 V9.0.0 (Dec. 2009), titled "Technical Specification Group Radio Access Network Evolved Universal Terrestrial Radio Access and Evolved Universal Terrestrial Radio Access Network, Overall description Stage 2 (Release 8)",having Document No. 3GPP TS 36.211 V9.0.0 (Dec. 2009), dated Dec. 2009, pp. 1-85.*

3GPP TS 36.212 V8.8.0 (Feb. 2009), titled "Technical Specification 3rd Generation Partnership Project Technical Specification Group Radio Access Network Evolved Universal Terrestrial Radio Access (E-UTRA)Multiplexing and channel coding(Release 8)", was presented as Technical Report, 3GPP TS 36.212, dated Dec. 2009, pp. 1-60.*

3GPP TS 36.213 V9.1.0 (Mar. 2010), titled "Technical Specification 3rd Generation Partnership Project Technical Specification Group Radio Access Network Evolved Universal Terrestrial Radio Access, Physical layer procedures(Release 9)", presented as Technical Specification, 3GPP TS 36.213, Document No. 3GPP TS 36.213 V9.1.0 (Mar. 2010), p. 1-79.*

International Search Report, 4 pages, PCT/CN2010/077871.

"Discussion on Unified Framework for Multi-Granular Feedback", 3GPP TSG RAN WG1 Meeting #60bis, Apr. 12-16, 2010, 6 pages, Beijing, China.

"Multi Granular Feedback Design for LTE-A", 3GPP TSG-RAN WG1 #60bis, Apr. 12-16, 2010, 11 pages, Beijing, China.

\* cited by examiner

*Primary Examiner* — Andrew Lai
*Assistant Examiner* — Hoyet H Andrews
(74) *Attorney, Agent, or Firm* — Marger Johnson & McCollom, P.C.

(57) ABSTRACT

A method and device for acquiring channel information are disclosed in the present invention, to solve a technical problem in the related art that the channel information cannot be fed back flexibly according to requirements. The method includes: for one subband, User Equipment (UE) acquires Rank Indicator (RI) information of a current channel, in which the RI information indicates a rank (v) of the current channel, and v is a positive integral number not greater than 8; the user equipment determines the quantity of the Precoding Matrix Indicator (PMI) information required to be fed back to a base station according to v, and transmits the PMI information in said quantity and the RI information to the base station; the base station acquires the channel information of said subband according to the PMI information in said quantity and said RI information.

10 Claims, 4 Drawing Sheets

OBTAINING METHOD AND DEVICE FOR CHANNEL INFORMATION

TECHNICAL FIELD

The present invention relates to a field of communication, and more particularly, to a method and device for acquiring the channel information.

BACKGROUND OF THE RELATED ART

In a wireless communication system, both transmitter-side and receiver-side use multiple antennas to acquire a higher rate by way of spatial multiplexing. Compared with the common spatial multiplexing methods, an improved technology, in which the receiver-side feeds back the channel information to the transmitter-side and the transmitter-side uses transmitting precoding technology according to the acquired channel information, can largely improve the transmission performance. In a mode of Single-User Multi-input Multi-output (SU-MIMO), channel characteristic vector information is directly utilized to perform the precoding; in a mode of Multi-Users Multi-input Multi-output (MU-MIMO), the relatively accurate channel information is needed.

In 3GPP Long Term Evolution (or simply, LTE) plan, the feedback of channel information is mainly to utilize a relatively simple feedback method of a single codebook, and the performance of transmitting precoding technology of MIMO depends more on feedback accuracy of the codebook therein.

Herein, the fundamental of quantization feedback of channel information based on a codebook is set forth briefly as following:

Supposing the capacity of a limited feedback channel is B bps/Hz, the number of available code words is $N=2^B$. The characteristic vector space of a channel matrix after quantization forms a codebook space $\Re = \{F_1, F_2, \ldots, F_N\}$. A transmitter-side and a receiver-side jointly save or generate the codebook $\Re$ (same in both transmitter-side and receiver-side) in real time. For each channel realization H, the receiver-side selects one code word $\hat{F}$ that best matches the channel realization H from the codebook space $\Re$ according to certain principles, and feeds back the sequence number i (code word sequence number) of the code word $\hat{F}$ to the transmitter-side. Herein, the code word sequence number is called codebook Precoding Matrix Indicator (or simply, PMI). The transmitter-side seeks out the corresponding precoding code word $\hat{F}$ according to this sequence number i, thereby acquiring corresponding channel information, and $\hat{F}$ indicates characteristic vector information of the channel.

Normally, the codebook space $\Re$ can be further divided into codebooks corresponding to a plurality of Ranks, and each Rank corresponds to a plurality of code words for quantizing the precoding matrix composed of characteristic vectors under the Rank. Since the Rank of a channel is equal to the number of non-zero characteristic vectors, the number of columns of code words normally is N when the Rank is N. Therefore, the code book space $\Re$ can be divided into a plurality of sub-codebooks according to different Ranks, as shown in Table 1.

TABLE 1

An illustration of a codebook being divided into a plurality of sub-codebooks according to Ranks $\Re$

| The number of layer υ (Rank) | | | |
|---|---|---|---|
| 1 | 2 | ... | N |
| $\Re_1$ | $\Re_2$ | ... | $\Re_N$ |
| A vector set of code words with the number of columns being 1 | A matrix set of code words with the number of columns being 2 | | A matrix set of code words with the number of columns being N |

In this case, when Rank>1, all code words required to be stored are in a form of matrix;

wherein codebooks in a LTE protocol use this feedback method of codebook quantization, and a codebook of downlink 4 transmitting antennas of LTE is shown in Table 2; in fact, a precoding codebook in LTE and the codebook quantized by channel information have the same meaning. In the following, for unification, a vector can also be regarded as a matrix with one dimension.

TABLE 2

An illustration of a codebook of downlink 4 transmitting antennas of LTE

| Codebook | | The total number of layers υ | | | |
|---|---|---|---|---|---|
| Index | $u_n$ | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In this case, for $W_n = I - 2u_n u_n^H / u_n^H u_n$, I is a unit matrix, and $W_k^{(j)}$ represents jth column of vector of matrix $W_k$. $W_k^{(j_1, j_2, \cdots j_n)}$ represents a matrix composed of columns $j_1$, $j_2, \ldots, j_n$ of matrix $W_k$, and $u_n^H$ represents a conjugate transpose matrix of $u_n$; wherein n denotes the sequence number with a value from 0 to 15.

With the development of communication technology, in advanced Long Term Evolution (LTE-Advanced), higher requirements have been put forward for spectrum efficiency, and as a result the number of antennas is also increased to 8 and a codebook feedback of 8 transmitting antennas is needed to be designed to perform the quantization feedback of channel information.

In the standards of LTE, a minimum feedback unit of channel information is a subband, and one subband is composed of several Resource Blocks (RB), and each RB is composed of a plurality of Resource Elements (RE). RE is a minimum unit of time-frequency resource in LTE, and a resource representation method of LTE is still used in LTE-A.

In the related art, there is an idea that is very different with previous feedback mode of a single codebook, and it can be described as: a user equipment (UE) feeds back one first Precoding Matrix Indicator (PMI1) information, and a base station seeks out a corresponding code word WPMI1 in codebook C1 according to PMI1; the UE also feeds back other one or more Precoding Matrix Indicator (PMI) information that are represented as PMI2 to PMIn (respectively called second Precoding Matrix Indicator information, . . . , nth Precoding Matrix Indicator information); the base station seeks out the corresponding code words WPMI2 to WPMIn from the corresponding codebooks, and constructs one matrix by using a function relationship F(WPMI1, WPMI2, . . . WPMIn) to indicate the channel information of a subband. Take 2 PMI for example, the channel information can be represented by a plurality of function relationships such as product or Kronecker product (its operator is represented by $\otimes$) and the like:

$$\begin{bmatrix} WPMI1 & O \\ O & WPMI1 \end{bmatrix} WPMI2$$

or WPMI1×WPMI2, WPMI2 $\otimes$ WPMI1 and the similar function relationships.

Feedbacks of a plurality of PMI can be used to respectively configure feedback periods of various PMI, thereby utilizing the feedback resource effectively, and it can also improve feedback precision effectively, without needing to design one single codebook having a large number of code words, and this method reduces the complexity of design of codebook.

However, a problem existing in the related art is that, this feedback mode is required to be used in all cases, and in the case of higher Rank, the performance gain brought by feeding back PMI2 to characterize the changed WPMI2 is limited. Moreover, in the case of a large number of feedbacks of PMI2 and high Rank, more applications are in a mode of single-user MIMO (SU-MIMO), and their requirement for feedback precision is relatively low.

SUMMARY OF THE INVENTION

The present invention provides a method and device for acquiring channel information, to solve a technical problem in the related art that the channel information cannot be fed back flexibly according to requirements.

In order to solve the above technical problem, the present invention provides a method for acquiring channel information, and the method includes:

for one subband, a User Equipment (UE) acquiring Rank Indicator (RI) information of a current channel, wherein a rank (v) of the current channel is indicated in the RI information, and v is a positive integral number not greater than 8;

the user equipment determining the quantity of Precoding Matrix Indicator (PMI) information required to be fed back to a base station according to v, and transmitting the PMI information in said quantity and the RI information to the base station;

the base station acquiring the channel information of said subband according to the PMI information in said quantity and said RI information.

Preferably, the step of the user equipment determining the quantity of Precoding Matrix Indicator (PMI) information required to be fed back to a base station according to v comprises: when v is greater than or equal to N0, the user equipment determines that the quantity of the PMI information is m; when v is less than N0, the user equipment determines that the quantity of the PMI information is m+1; wherein N0 is an integral number greater than 0 and less than or equal to 8, and m is an integral number and determined according to a level of feedback precision of the user equipment. Preferably, the step of the user equipment determining the quantity of PMI information required to be fed back to a base station according to v also comprises: when v is less than N1, the user equipment determining that the quantity of the PMI information is m+2; wherein N1 is an integral number less than N0 and greater than 0.

Preferably, the PMI information at least comprises first Precoding Matrix Indicator (PMI1) information. Preferably, the step of the base station acquiring the channel information of the subband according to the PMI information and the RI information comprises: when the quantity of the PMI information determined by the user equipment is 1, the base station seeks out a code word W1 from a first codebook according to the PMI1 information and the RI information, and acquires the channel information of the subband according to the code word W1 and a function F(W1, W2, . . . , Wn) of n−1 matrixes, or the base station represents the code word W1 as channel information of the subband; wherein the n−1 matrixes are convention values; n is an integral number; or the base station directly acquires the channel information of the subband according to the code word W1; when the quantity of the PMI information determined by the user equipment is r, the base station seeks out the code word W1 from the first codebook according to the PMI1 information and the RI information, and seeks out r−1 matrixes corresponding to other r−1 PMI information from corresponding codebooks according to other r−1 PMI information except the PMI1 information, acquires the channel information of the subband according to the code word W1 and the function F(W1, W2, . . . , Wn) of the n−1 matrixes including the r−1 matrixes, wherein other n−r matrixes except the r−1 matrixes in said n−1 matrixes are convention values; or the base station acquires the channel information of the subband according to the code word W1 and a function f(W1, W2, . . . , Wr) of the r−1 matrixes; wherein r is an integral number greater than or equal to 2. Preferably, the convention values are fixed vectors or matrixes or different convention values according to the rank (v) of the current channel; wherein v represents the rank of channel represented by the RI information.

Preferably, when r is equal to 2, function F(W1, W2) comprises W1×W2 or W2 $\otimes$ W1; when r is equal to 3, function F(W1, W2, W3) comprises (W3'*W3)×W1×W2 or W2⊗(W3'×W3×W1), wherein W3' denotes a conjugate transpose matrix of W3.

The present invention also provides another method for configuring channel information, and the method comprises:

a base station sends a configuration signaling, indicating the quantity of Precoding Matrix Indicator (PMI) information required to be fed back by user equipment through the configuration signaling;

the user equipment determines the PMI information required to be fed back to the base station according to the configuration signaling, and feeds back the determined PMI information and Rank Indicator (RI) information of a current channel to the base station;

the base station acquires the channel information of subband according to the PMI information and RI information.

Preferably, the method further comprises: the base station determines the quantity of PMI information required to be fed back by the user equipment according to the rank of channel fed back by the user equipment or polarization configuration information.

Preferably, the base station makes the configuration signaling carried in a Radio Resource Control (RRC) signaling of a high layer channel or a physical downlink control channel (PDCCH) to be transmitted to the user equipment.

The present invention also provides a device for acquiring channel information, and the device comprises:

a receiving module, which is configured to receive Precoding Matrix Indicator (PMI) information transmitted by a user equipment and Rank Indicator (RI) information of a current channel;

an acquiring module, which is configured to acquire the channel information of a subband according to the PMI information and RI information received by said receiving module;

wherein the quantity of PMI information is determined by the user equipment according to rank v of the current channel; v is indicated in the RI information and v is a positive integral number not greater than 8.

Preferably, the PMI information comprises at least first Precoding Matrix Indicator (PMI1) information; the acquiring module is configured to acquire the channel information of the subband by the following method: when the quantity of the PMI information determined by the user equipment is 1, seeking out a code word W1 from a first codebook according to the PMI1 information and the RI information; acquiring the channel information of the subband according to the code word W1 and a function F(W1, W2, ..., Wn) of n−1 matrixes, or representing the code word W1 as the channel information of the subband; wherein the n−1 matrixes are convention values, and n is an integral number; or acquiring the channel information of the subband according to the code word W1.

Preferably, the PMI information comprises at least first Precoding Matrix Indicator (PMI1) information; the acquiring module is configured to acquire the channel information of the subband by the following method: when the quantity of the PMI information determined by the user equipment is r, seeking out the code word W1 from the first codebook according to the PMI1 information and the RI information, and seeking out r−1 matrixes corresponding to other r−1 PMI information from codebooks corresponding to other r−1 PMI information except the PMI1 information; acquiring the channel information of the subband according to the code word W1 and a function F(W1, W2, ..., Wn) of n−1 matrixes including the r−1 matrixes, wherein other n−r matrixes except the r−1 matrixes in the n−1 matrixes are convention values; or acquiring the channel information of the subband according to the code word W1 and a function f(W1, W2, ..., Wr) of the r−1 matrixes; wherein r is an integral number greater than or equal to 2.

In order to solve the above technical problem, the present invention also provides a device for configuring channel information, and the device includes:

a transmitting module, which is configured to send a configuration signaling, indicating the quantity of Precoding Matrix Indicator (PMI) information required to be fed back by a user equipment through the configuration signaling, so as to make the user equipment determine the PMI information required to be fed back according to the configuration signaling;

a receiving module, which is configured to receive the PMI information transmitted by the user equipment and Rank Indicator (RI) information of a current channel;

an acquiring module, which is configured to acquire the channel information of a subband according to the PMI information and the RI information received by said receiving module.

Preferably, the transmitting module is also configured to determine the quantity of PMI information required to be fed back by the user equipment according to the rank of channel fed back by the user equipment or polarization configuration information.

Preferably, the transmitting module is configured to make the configuration signaling carried in a Radio Resource Control (RRC) signaling of a high layer channel or a physical downlink control channel (PDCCH) to be transmitted to the user equipment.

Compared with the related art, the technical scheme of the present invention provides a method and device for acquiring the channel information under 8 antennas, and it is able to provide a plurality of feedback precisions, flexibly configure the feedback with different precisions according to specific requirements, and make use of the feedback overhead effectively.

The other features and advantages of the present invention will be set forth in the subsequent specification, and they partly become apparent from the specification or are understood by implementing the present invention. The purposes and other advantages of the present invention can be realized and obtained through the structure specified by the specification, claims and appended drawings.

BRIEF DESCRIPTION OF DRAWINGS

The drawings are used to provide a further understanding for the present invention, and constitute a part of the specification. The drawings are used to illustrate the present invention along with embodiments of the present invention and not intended to limit the present invention. In the drawings.

PREFERRED EMBODIMENTS OF THE PRESENT INVENTION

The implementations of the present invention will be described below in detail in conjunction with drawings and embodiments, thereby clearly understanding the realization process of how to utilize techniques to solve technical problems and reach technical effects and implementing them accordingly.

Firstly, if there is no conflict, the embodiments of the present invention and the features in the embodiments can be combined with each other within the protection scope of the present invention. Furthermore, the steps shown in the flowcharts of the accompanying drawings can be performed in a computer system such as a set of computer executable instructions, and although the logical order is shown in the flowcharts, the shown or described steps can be performed in an order different from the order here in some cases.

In the related art, in addition to the foregoing defect that the feedback of channel information is not enough flexible, the inventors have found through research that only little gain can be obtained by feeding back PMI2 when a user equipment (UE) and an evolved Node B (eNodeB, also called base station) are dual-polarized (both the UE and eNodeB uses dual-polarized antennas). In addition, there are also other cases in which it is not necessary for the feedback of a plurality of PMI to be used, and when the requirement for feedback precision is relatively low, the feedback of a plurality of PMI will waste cost and overhead needlessly.

The UE feeds back at least one of the rank information (RI) v of channels, Precoding Matrix Indicator information PMI1 and Precoding Matrix Indicator information PMI2 to PMIn. The UE judges the PMI required to be fed back according to v or v and other information.

When the UE judges that one PMI needs to be fed back, the UE feeds back PMI1, and the base station seeks out one code word W1 from a first codebook according to RI and PMI1 and regards W2 to Wn as convention values. The base station acquires the channel information of the subband according to F(W1, W2, ..., Wn), or represents the channel information directly by W1.

When the UE judges that r PMI need to be fed back, the UE feeds back a plurality of PMI including PMI1, and the base station seeks out one code word W1 from the first codebook according to RI and PMI1. Corresponding matrixes W2 to Wr are found from the corresponding codebooks according to PMI2 to MPIr. Wr+1 to Wn are convention values. The base station acquires the channel information of the subband according to F(W1, W2, ..., Wn). Alternatively, the base station represents the channel information only according to f(W1, W2, ..., Wn). n is an integral number not less than 2, and r is less than or equal to n and greater than or equal to 1.

Said convention values can be fixed convention vectors or matrixes; preferably, they can be unit matrixes.

Said convention values can also be different convention values according to the rank (v) of RI.

Said base station performs the judgment according to v, and when v meets a condition of v<N0, only m PMI are fed back, and if not, m+1 PMI are fed back; the value of m is determined by other information. N0 can be 2, 3, 4 or 5.

Alternatively, if v meets a condition of v>=N0, only m PMI are fed back; when N1<=v<N0, m+1 PMI are fed back; and when v<N1, m+2 PMI are fed back.

The value of m is determined by other information, for example a level of feedback precision of UE.

Alternatively, a method below is used:

for the channel information of subband, the base station sends a configuration signaling which is used for configuring r ones of the Precoding Matrix Indicator information PMI1 to PMIn needing to be fed back by UE: PMI1 to PMIr. The UE feeds back r precoding matrixes according to the configuration signaling, wherein r is greater than or equal to 1 and less than or equal to n.

When configured to feed back r PMI, the UE feeds back at least PMI1 and RI information, and the base station seeks out one code word W1 from a first codebook according to RI and PMI1. If r is not equal to 1, the UE still needs to feed back PMI2 to PMIr, and the base station seeks out corresponding matrixes W2 to Wr from corresponding codebooks according to PMI2 to PMIr.

Wr+1 to Wn are convention values, and the base station acquires the channel information of the subband according to F(W1, W2, ..., Wn).

Alternatively, the base station acquires the channel information according to f(W1, W2, ..., Wn). When r is 1, W1 represents the channel information directly.

Further, said convention values can be fixed convention vectors or matrixes;

Further, said convention values can also be different convention values according to different RI.

Preferably, the configuration signaling sent by the base station is carried in a physical downlink control channel (PDCCH);

preferably, the configuration signaling sent by the base station is carried in a Radio Resource Control (RRC) signaling of a high layer channel.

Preferably, the base station configures the value of r according to the RI information.

Preferably, the base station configures the value of r according to polarization information.

In a technical scheme of the present invention, for the channel information of subband, the UE acquires the Rank indicator (RI) information of a current channel, acquires the rank (v) of the current channel from the RI information, and determines the quantity of PMI required to be fed back to the base station according to v. When v is greater than or equal to N0, the UE feeds back m Precoding Matrix Indicator (PMI) information and the RI; when v is less than N0, the UE feeds back m+1 Precoding Matrix Indicator (PMI) information and the RI; wherein m is determined according to information such as the level of feedback precision of the UE and the like, and N0 is an integral number greater than 0 and less than or equal to 8, for example 2, 3, 4, 5 and so on.

In the technical scheme of the present invention, when v meets a condition of v<N0, it further includes:

when v meets a condition of N1<=v<N0, the UE feeds back m+1 PMI information and the RI information to the base station; N1 is an integral number greater than 0 and less than N0;

when v meets a condition of v<N1, the UE feeds back m+2 PMI information and the RI information to the base station.

When the UE judges that one PMI needs to be fed back, the UE feeds back the first Precoding Matrix Indicator (PMI1) information, and the base station seeks out one code word W1 (or called matrix W1) from the first codebook according to RI and PMI1, and other matrixes W2 to Wn are convention values, wherein n is an integral number not less than 2. According to a function F(W1, W2, ..., Wn) of all n code words W1, W2, ..., and Wn, the base station acquires the channel information of the subband, or represents W1 directly as the channel information.

When the UE judges that r PMI need to be fed back, the UE feeds back a plurality of PMI including PMI1, and the base station seeks out one code word W1 from the first codebook according to RI and PMI1, and seeks out corresponding matrixes W2 to Wr (r is less than or equal to n and greater than or equal to 2) from the corresponding codebooks according to PMI2 to MPIr, and other matrixes Wr+1 to Wn are convention values. The base station acquires the channel information of the subband according to the function F(W1, W2, ..., Wn) of all n code words W1, W2, ..., and Wn, or acquires the channel information of the subband only according to a function f(W1, W2, ..., Wn) of r code words W1, W2, ..., and Wr.

Said convention values can be fixed convention vectors or matrixes; and preferably, they can be unit matrixes.

Said convention values can also be different convention values according to v.

In another technical scheme of the present invention, for the channel information of subband, the base station sends a configuration signaling, and the configuration signaling is used for configuring x ones of the Precoding Matrix Indicator information PMI1 to PMIn required to be fed back by the UE, identified by PMI1 to PMIx respectively, wherein x is greater than or equal to 1 and less than or equal to n, and n is an integral number not less than 2. When receiving the configuration signaling, according to indication of the configuration signaling, the UE feeds back x Precoding Matrix Indicator information PMI1 to PMIx and the Rank Indicator (RI) information of the current channel to the base station.

When the configuration signaling indicates that the UE needs to feed back x PMI information, the x PMI information at least feed back the first Precoding Matrix Indicator (PMI1) information. For the PMI1 information, the base station seeks out one code word W1 from a first codebook according to the RI information and PMI1 information. If x is not equal to 1, the UE also needs to feed back the second Precoding Matrix Indicator (PMI2) information, the third Precoding Matrix Indicator (PMI3) information, ..., until the xth Precoding Matrix Indicator (PMIx) information, and the base station seeks out corresponding matrixes W2 to Wx from the corresponding codebooks according to PMI2 to MPIx. Wr+1 to Wn are convention values.

The base station acquires the channel information of the subband according to the function F(W1, W2, ..., Wn) of n PMI information W1, W2, ..., Wn; alternatively, the base station acquires channel information of the subband according to the function f(W1, W2, ..., Wx) of x PMI information W1, W2, ..., Wx.

When x is 1, W1 can directly represent the channel information of the subband.

Said convention values can be fixed convention vectors or matrixes, and preferably said convention values can be different convention values according to v.

Preferably, the configuration signaling sent by the base station is carried in a physical downlink control channel (PDCCH), and can also be carried in a Radio Resource Control (RRC) signaling of a high layer channel.

Preferably, the base station can determine the quantity x according to the RI information, and can also configure the quantity x according to the polarization information.

Figure 1:
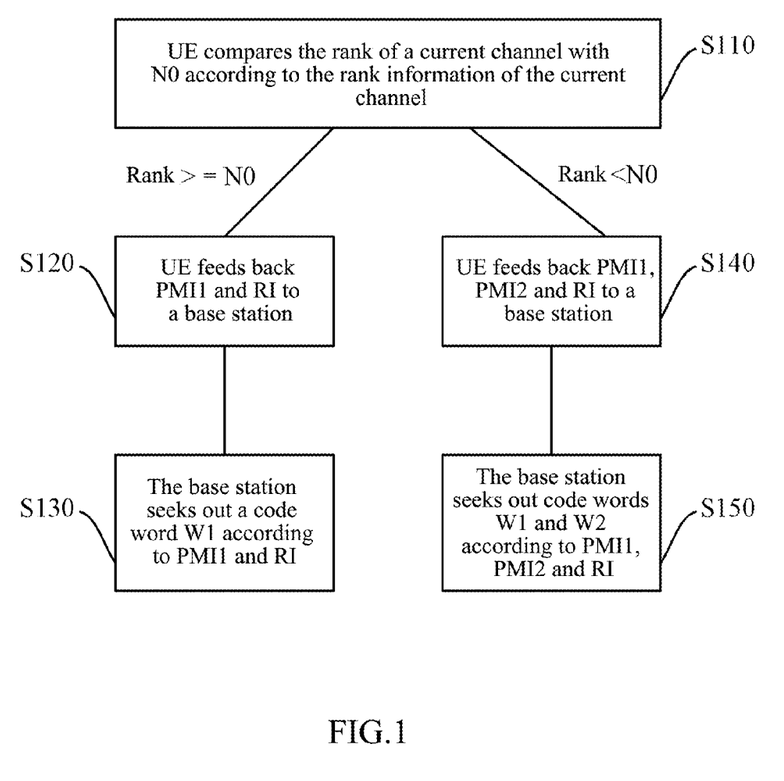
FIG. 1 is a schematic flowchart of embodiment one of the present invention.

Embodiment one illustrates a method for acquiring channel information, and as shown in FIG. 1, it mainly includes the following steps:

step S110: the UE acquires the channel information through pilot frequency and channel estimation, and compares the rank (v) of a current channel with N0 according to Rank Indicator (RI) information of a current channel; if meeting $v \geq N0$, then proceed to step S120, and if not (namely $v < N0$), then proceed to step S140;

step S120: the UE feeds back the value of one PMI, and feeds back PMI1 and RI to the base station (eNodeB); the case of $v \geq N0$ is more applicable to the case of single-user MIMO (SU-MIMO), in which the requirement of feedback precision is not high, and the UE selects one PMI to perform the channel information feedback;

step S130: after receiving PMI1 and RI, according to the PMI1 and RI, the base station seeks out a corresponding code word W1 from an agreed codebook, and takes the code word W1 as the channel information, and it ends.

Step S140: the UE feeds back the values of 2 PMI, and feeds back PMI1, PMI2 and RI to the base station; the case of $v < N0$ is more applicable to the case of multiple-user MIMO (MU-MIMO), in which the requirement of feedback precision is higher, and the UE can select 2 PMI to perform the channel information feedback;

step S150: after receiving PMI1, PMI2 and RI, according to the PMI1, PMI2 and RI, the base station seeks out corresponding code words W1 and W2 from agreed codebooks, and takes W1×W2 or W2⊗W1 as the channel information according to agreed functions, and it ends.

Figure 2:
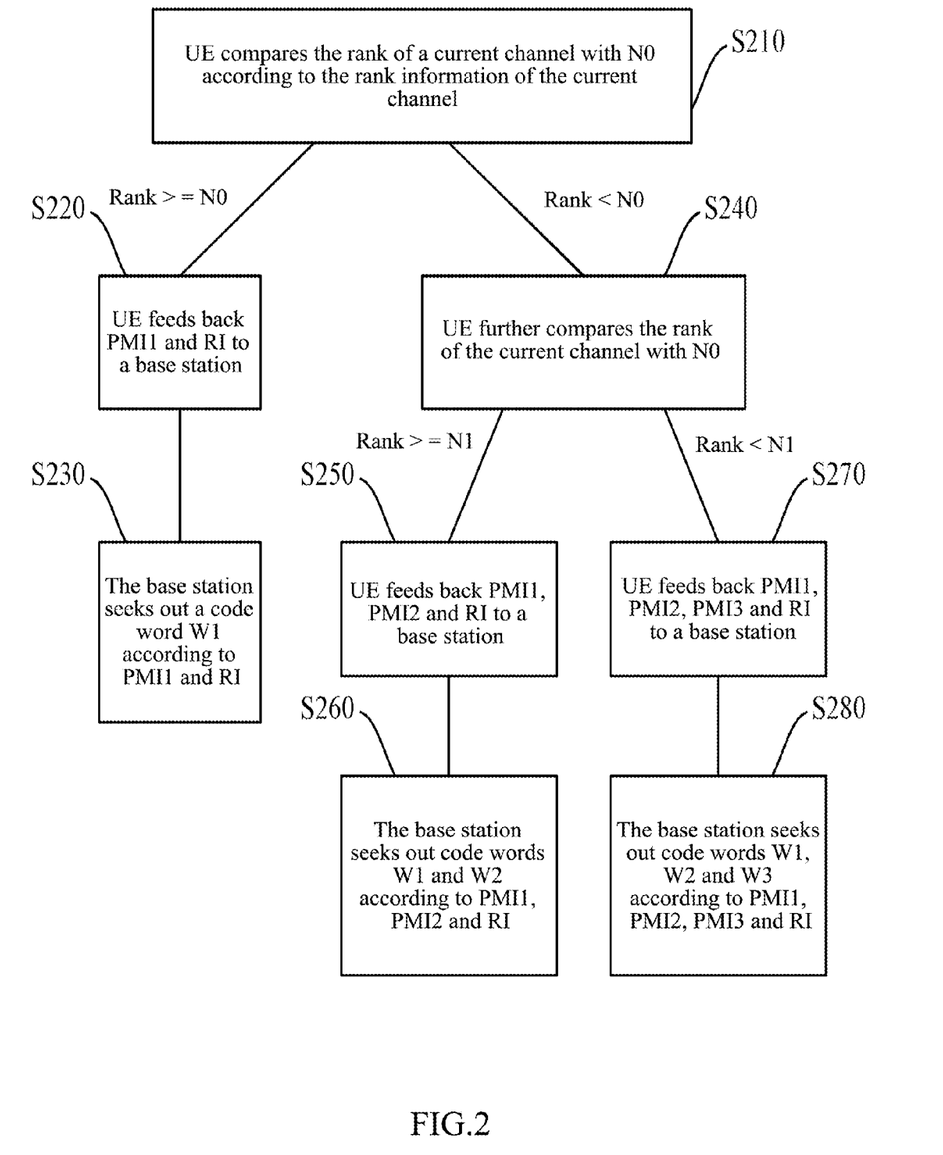
FIG. 2 is a schematic flowchart of embodiment two of the present invention.

Embodiment two illustrates a method for acquiring channel information, and as shown in FIG. 2, it mainly includes the following steps:

step S210: the UE acquires the channel information through pilot frequency and channel estimation, and compares the rank (v) of a current channel with N0 according to the Rank Indicator (RI) information of the current channel; if meeting $v \geq N0$, then proceed to step S220, and if not (namely $v < N0$) then proceed to step S240; wherein N0 is preferably equal to 5;

step S220: the UE feeds back the value of one PMI, and feeds back PMI1 and RI to the base station (eNodeB); the case of $v \geq N0$ is more applicable to the case of single-user MIMO (SU-MIMO), in which the requirement of feedback precision is not high, and the UE selects one PMI to perform the channel information feedback;

step S230: after receiving PMI1 and RI, according to the PMI1 and RI, the base station seeks out a corresponding code word W1 from an agreed codebook, and takes the code word W1 as the channel information, and it ends.

Step S240: the UE further compares v with N1; if meeting $N1 \leq v < N0$, then proceed to step S250, and if not, then proceed to step S270; wherein N1 is preferably equal to 3 (in another embodiment, N1 is equal to 2);

step S250: the UE feeds back the values of 2 PMI, and feeds back PMI1, PMI2 and RI to the base station; the case of $v < N0$ is more applicable to the case of multiple-user MIMO (MU-MIMO), in which the requirement of feedback precision is higher, and the UE can select 2 PMI to perform the channel information feedback;

step S260: after receiving PMI1, PMI2 and RI, according to the PMI1, PMI2 and RI, the base station seeks out corresponding code words W1 and W2 from agreed codebooks, and takes W1×W2 or W2⊗W1 as the channel information according to agreed functions, and it ends.

Step S270: the UE feeds back PMI1, PMI2, PMI3 (information related to channel) and RI to the base station; for $v < N1$, this case not only requires higher feedback precision, but relative to the case of $N1 \leq v < N0$, the information related to channel can also be used, thereby further improving the feedback precision, and therefore 3 PMI are needed, and the UE can select 3 PMI to perform the channel information feedback;

step S280: after receiving PMI1, PMI2, PMI3 and RI, according to the PMI1, PMI2, PMI3 and RI, the base station seeks out corresponding code words W1, W2 and W3 from agreed codebooks, and takes (W3'*W3)×W1×W2 or W2⊗(W3'×W3×W1) as the channel information according to agreed functions, and it ends; wherein W3' represents a conjugate transpose matrix of W3.

Embodiment three illustrates a method for acquiring channel information, in which a part of steps are in accordance with the ones of the foregoing embodiment one, and the major difference from embodiment one lies in that:

in the case of v<N0, after receiving PMI1, PMI2 and RI, the base station seeks out corresponding code words W1 and W2 from agreed codebooks according to the PMI1, PMI2 and RI, and acquires the channel information according to W1×W2×G, wherein G is a fixed matrix (for example an unit matrix).

The technical scheme of this embodiment is also applicable to the case of N1<=v<N0 in the foregoing embodiment two, namely a part of steps of other embodiment of the present invention are the same as the ones of the foregoing embodiment two, and the major difference from embodiment two lies in that:

in the case of N1<=v<N0, after receiving PMI1, PMI2 and RI, the base station seeks out corresponding code words W1 and W2 from agreed codebooks according to the PMI1, PMI2 and RI, and acquires the channel information according to W1×W2×G, wherein G is a fixed matrix (for example an unit matrix).

Embodiment four illustrates a method for acquiring channel information, in which a part of steps are in accordance with the ones of the foregoing embodiment one, and the major difference from embodiment one lies in that:

in the case of v<N0, after receiving PMI1, PMI2 and RI, the base station seeks out corresponding code words W1 and W2 from agreed codebooks according to the PMI1, PMI2 and RI, and acquires the channel information according to W1×W2×G, wherein G is a matrix determined according to the value of RI; if v=1, G is $$\begin{bmatrix} 1 \\ -1 \end{bmatrix};$$

if v=2, G is $$\begin{bmatrix} 1 & 1 \\ -1 & 1 \end{bmatrix};$$

if v=3, G is $$\begin{bmatrix} 1 & 1 & 1 \\ -1 & 1 & -1 \end{bmatrix};$$

and so on.

The technical scheme of this embodiment is also applicable to the case of N1<=v<N0 in the foregoing embodiment two, namely a part of steps of other embodiment of the present invention are same as the ones of the foregoing embodiment two, and the major difference from embodiment two lies in that:

in the case of N1<=v<N0, after receiving PMI1, PMI2 and RI, the base station seeks out corresponding code words W1 and W2 from agreed codebooks according to the PMI1, PMI2 and RI, and acquires the channel information according to W1×W2×G, wherein G is a matrix determined according to RI; if v=1, G is $$\begin{bmatrix} 1 \\ -1 \end{bmatrix};$$

if v=2, G is $$\begin{bmatrix} 1 & 1 \\ -1 & 1 \end{bmatrix};$$

if v=3, G is $$\begin{bmatrix} 1 & 1 & 1 \\ -1 & 1 & -1 \end{bmatrix};$$

and so on.

Figure 3:
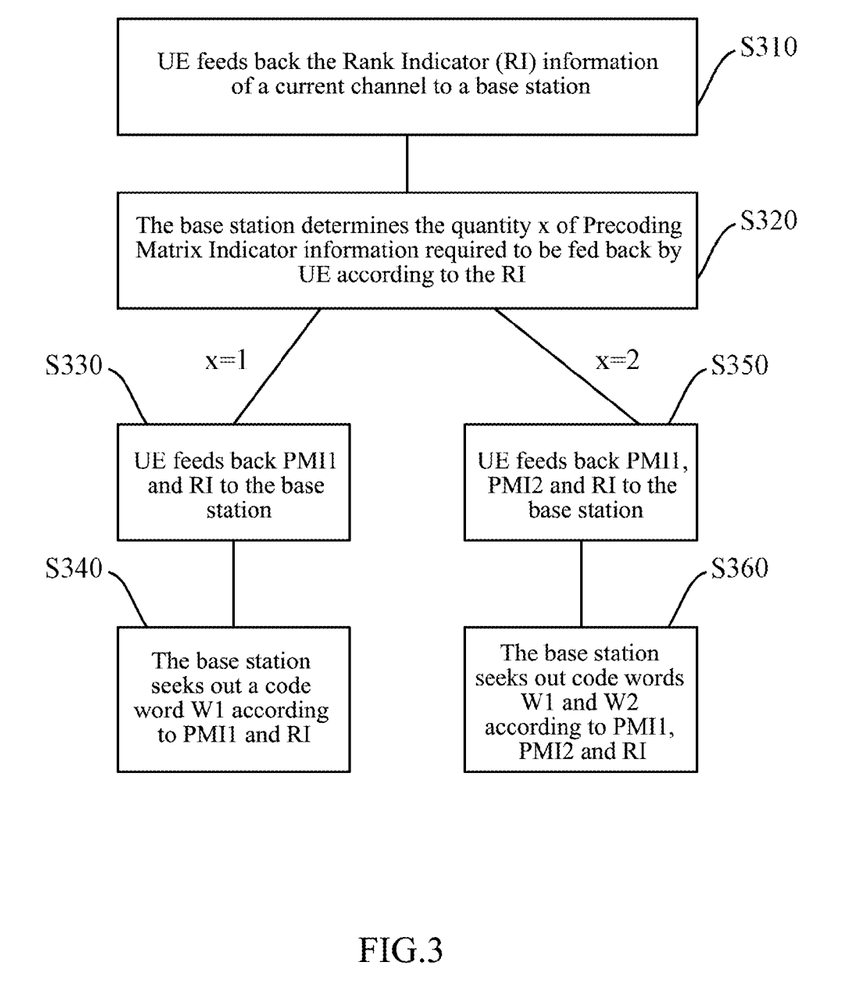
FIG. 3 is a schematic flowchart of embodiment five of the present invention.

Embodiment five illustrates a method for acquiring channel information, and as shown in FIG. 3, the configuration method mainly includes the following steps:

step S310: the UE acquires the channel information through pilot frequency and channel estimation, and feeds back the Rank Indicator (RI) information of a current channel to a base station (eNodeB);

step S320, the base station determines the quantity x of Precoding Matrix Indicator (PMI) information required to be fed back by the UE according to the RI fed back by the UE, and transmits the quantity x to the UE through a configuration signaling, wherein if x is equal to 1, proceed to step S330, and if not, then proceed to step S350;

in a particular application, the base station acquires the rank (v) of a current channel according to the RI, and when v>=N0, the base station determines that the quantity x of the Precoding Matrix Indicator (PMI) information required to be fed back by the UE is equal to 1; otherwise the base station determines that the quantity x of the Precoding Matrix Indicator (PMI) information required to be fed back by the UE is equal to 2;

the case of v>=N0 is more applicable to the case of single-user MIMO (SU-MIMO), in which the requirement of feedback precision is not high, and the UE can select one PMI to perform the channel information feedback;

the case of v<N0 is more applicable to the case of multiple-user MIMO (MU-MIMO), in which the requirement of feedback precision is higher, and the UE selects 2 PMI to perform the channel information feedback;

step S330: the UE receives the configuration signaling, acquires the quantity x therein that is equal to 1, and feeds back PMI1 and RI to the base station;

step S340: after receiving PMI1 and RI, according to the PMI1 and RI, the base station seeks out a corresponding code word W1 from an agreed codebook, and takes the code word W1 as the channel information, and it ends.

Step S350: the UE receives the configuration signaling, acquires the quantity x therein that is equal to 2, and the UE feeds back the values of 2 PMI and feeds back PMI1, PMI2 and RI to the base station;

step S360: after receiving PMI1, PMI2 and RI, according to the PMI1, PMI2 and RI, the base station seeks out corresponding code words W1 and W2 from agreed codebooks, and takes W1×W2 or W2⊗W1 as the channel information according to agreed functions, and it ends.

Figure 4:
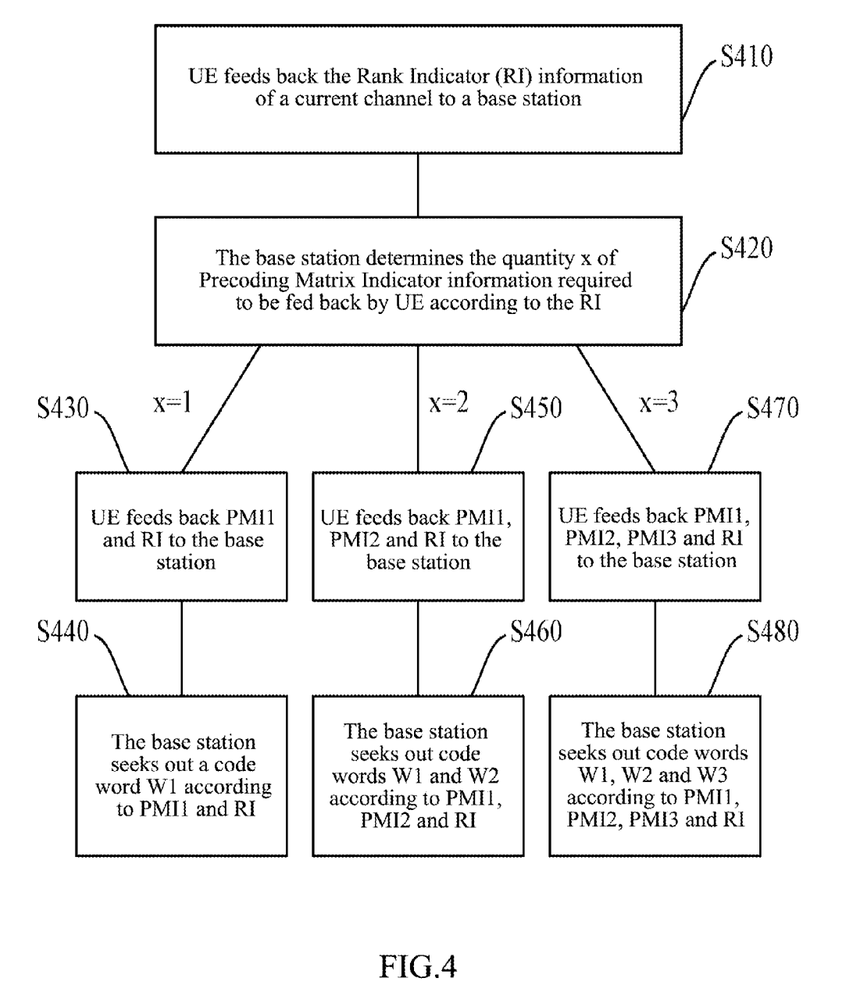
FIG. 4 is a schematic flowchart of embodiment six of the present invention.

Embodiment six illustrates a method for acquiring channel information, and as shown in FIG. 4, the configuration method mainly includes the following steps:

step S410: the UE acquires the channel information through pilot frequency and channel estimation, and feeds back it to a base station (eNodeB) according to the Rank Indicator (RI) information of a current channel;

step S420, the base station determines the quantity x of Precoding Matrix Indicator (PMI) information required to be fed back by UE according to the RI fed back by the UE, and transmits the quantity x to the UE through a configuration signaling, wherein if x is equal to 1, proceed to step S430, if x is equal to 2, then proceed to step S450, and if x is equal to 3, then proceed to step S470;

in a particular application, the base station acquires the rank (v) of a current channel according to the RI, and when v>=N0, the base station determines that the quantity x of the Precoding Matrix Indicator (PMI) information required to be fed back by the UE is equal to 1; when N1<=v<N0, the base station determines that the quantity x of the Precoding Matrix Indicator (PMI) information required to be fed back by the UE is equal to 2; when v<N1, the base station determines that the quantity x of the Precoding Matrix Indicator (PMI) information required to be fed back by the UE is equal to 3; in this embodiment, N0 is preferably equal to 5, and N1 is preferably equal to 3 (in other embodiment, N1 is preferably equal to 2);

the case of v>=N0 is more applicable to the case of single-user MIMO (SU-MIMO), in which the requirement of feedback precision is not high, and the UE selects one PMI to perform the channel information feedback;

the case of N1<=v<N0 is more applicable to the case of multiple-user MIMO (MU-MIMO), in which the requirement of feedback precision is higher, and the UE can select 2 PMI to perform the channel information feedback;

the case of v<N1 not only requires higher feedback precision, but relative to the case of N1<=v<N0, the information related to channel can also be used, thereby further improving the feedback precision, and therefore 3 PMI are needed, and the UE can select 3 PMI to perform the channel information feedback;

step S430: the UE receives the configuration signaling, acquires the quantity x therein that is equal to 1, and feeds back PMI1 and RI to the base station;

step S440: after receiving PMI1 and RI, according to the PMI1 and RI, the base station seeks out a corresponding code word W1 from an agreed codebook, and takes the code word W1 as the channel information, and it ends.

Step S450: the UE receives the configuration signaling, acquires the quantity x therein that is equal to 2, and feeds back PMI1, PMI2 and RI to the base station;

step S460: after receiving PMI1, PMI2 and RI, according to the PMI1, PMI2 and RI, the base station seeks out corresponding code words W1 and W2 from agreed codebooks, and takes W1×W2 or W2⊗W1 as the channel information according to agreed functions, and it ends.

Step S470: the UE receives the configuration signaling, acquires the quantity x therein that is equal to 3, and feeds back PMI1, PMI2, PMI3 (information related to channel) and RI to the base station;

step S480: after receiving PMI1, PMI2, PMI3 and RI, according to the PMI1, PMI2, PMI3 and RI, the base station seeks out corresponding code words W1, W2 and W3 from agreed codebooks, and takes (W3'*W3)×W1×W2 or W2⊗(W3'×W3×W1) as the channel information according to agreed functions, and it ends; wherein W3' represents a conjugate transpose matrix of W3.

Embodiment seven illustrates a method for acquiring channel information, in which a part of steps are in accordance with ones of the foregoing embodiment five, and the major difference from embodiment five lies in that:

the base station doesn't determine the quantity x of Precoding Matrix Indicator (PMI) information required to be fed back by UE according to the RI fed back by the UE, but determines the quantity x according to polarization configuration information. In this embodiment, when judging that the transmitter-side is in a configuration of dual polarization and the receiver-side is not in a configuration of dual polarization, the base station feeds back m+1 PMI, and therefore x=m+1, otherwise the base station feeds back m PMI, wherein the polarization information of receiver-side can be fed back by the UE.

The technical scheme of this embodiment is also applicable to the case of N1<=RI<N0 in the foregoing embodiment six, namely a part of steps of other embodiment of the present invention are same as the ones of the foregoing embodiment six, and the major difference from embodiment six lies in that:

the base station doesn't determine the quantity x of Precoding Matrix Indicator (PMI) information required to be fed back by UE according to the RI fed back by the UE, but determines the quantity x according to polarization configuration information. In this embodiment, when judging that the transmitter-side is in a configuration of dual polarization and the receiver-side is not in a configuration of dual polarization, the base station feeds back m+1 PMI, and therefore x=m+1, otherwise the base station feeds back m PMI, wherein the polarization information of receiver-side can be fed back by the UE.

In the foregoing embodiments, the base station can make the configuration signaling carried in a Radio Resource Control (RRC) signaling of a high layer channel to be transmitted to the UE. The RRC signaling is a signaling defined in LTE, and still used in LTE-A. For some channels that RI has not changed for a long time, making them carried in the high layer signaling can reduce a configuration overhead.

In the foregoing embodiments, the base station can make the configuration signaling carried in a physical downlink control channel (PDCCH) of a physical layer to be transmitted to the UE. The PDCCH channel is a downlink control channel defined by the physical layer in LTE, and there is also a corresponding physical downlink control channel in LTE-A. For some channels on which the RI easily change, making them carried in physical layer signaling can well configure the quantity of PMI fed back according to the value of RI.

In the foregoing embodiments, preferably when maximum quantity of PMI is 2 and the base station configures the channel information, 1 bit of information is preferably used to perform the configuration; preferably when maximum quantity of PMI is 3 and the base station configures the channel information, 2 bits of information is preferably used to perform the configuration.

Embodiment seven illustrates a device for acquiring the channel information, and the device includes:

a receiving module, which is configured to receive a certain quantity of Precoding Matrix Indicator (PMI) information transmitted by a user equipment and Rank Indicator (RI) information of a current channel;

an acquiring module, which is connected to the receiving module, and is configured to acquire channel information of a subband according to said a certain quantity of PMI information and the RI information;

wherein the user equipment determines the quantity of PMI information according to a rank v of the current channel; v is indicated in the RI information, and v is a positive integral number not greater than 8.

In this case, the acquiring module is configured to acquire the channel information of the subband by the following method: when the quantity of PMI information determined by the user equipment is 1, seeking out a code word W1 from a first codebook according to the PMI1 information and RI information; acquiring the channel information of the subband according to the code word W1 and a function F(W1, W2, ..., Wn) of n−1 matrixes, or representing the code word W1 as channel information of the subband; wherein the n−1 matrixes are convention values, and n is an integral number; or acquiring the channel information of the subband according to the code word W1.

In this case, the acquiring module is configured to acquire channel information of the subband by the following method: when the quantity of the PMI information determined by the user equipment is r, seeking out the code word W1 from the first codebook according to the PMI1 information and RI information, and seeking out corresponding r−1 matrixes from corresponding codebooks according to other r−1 PMI information except the PMI1 information in r PMI information; acquiring the channel information of the subband according to the code word W1 and a function F(W1, W2, ..., Wn) of n−1 matrixes, wherein other n−r matrixes except the r−1 matrixes in the n−1 matrixes are convention values; or acquiring the channel information of the subband according to the code word W1 and the function f(W1, W2, ..., Wn) of the r−1 matrixes, wherein r is an integral number greater than or equal to 2.

Embodiment eight illustrates a device for configuring the channel information, and the device includes:

a transmitting module, which is configured to send a configuration signaling, the quantity of Precoding Matrix Indicator (PMI) information required to be fed back by a user equipment being indicated through the configuration signaling;

a receiving module, which is configured to receive the PMI information transmitted by the user equipment and Rank Indicator (RI) information of a current channel;

an acquiring module, which is connected with the receiving module and is configured to acquire the channel information of a subband according to the PMI information and RI information;

wherein the user equipment is configured to determine the PMI information required to be fed back according to the configuration signaling.

In this case, the transmitting module is also configured to determine the quantity of PMI information required to be fed back by the user equipment according to the rank of channel fed back by the user equipment or polarization configuration information.

In this case, the transmitting module is configured to make the configuration signaling carried in a Radio Resource Control (RRC) signaling of a high layer channel or a physical downlink control channel (PDCCH) to be transmitted to the user equipment.

Those skilled in the art should understand that the above modules or steps of the present invention can be implemented by using a general-purpose computing device, and they can be integrated in a single computing device or distributed over a network composed of multiple computing devices; optionally, they can be implemented by using computing device executable program codes, thus, they can be stored in a storage device for being executed by the computing device, or they can be made into various integrated circuit modules respectively, or multiple modules or steps therein are made into a single integrated circuit module for implementation. In this way, the present invention is not limited to any particular combination of hardware and software.

Although the implementations disclosed in the present invention are given above, the described content is merely used to easily understand the implementations of the present invention, and is not intended to limit the present invention. Any skilled personnel in the technical field that the present invention belongs to should understand that any modifications and variations in the implementation form and details can be made without departing from the spirit and scope disclosed by the present invention, but the patent protection scope of the present invention should be in accordance with the scope defined by appended claims.

Industrial Applicability

Compared with the related art, it is able to provide multiple feedback precisions, flexibly configure the feedback with different precisions according to specific requirements, and make use of the feedback overhead effectively.

What we claim is:

1. A method for acquiring channel information, comprising:

for one subband, a User Equipment (UE) acquiring Rank Indicator (RI) of a current channel, wherein a rank (v) of said current channel is indicated in the RI, and the v is a positive integral number not greater than 8;

the user equipment determining a total number of Precoding Matrix Indicator (PMI) required to be fed back to a base station according to the v, and transmitting the PMI corresponding to the total number and the RI to the base station; and the base station acquiring channel information of said subband according to the PMI corresponding to the total number and the RI;

wherein the PMI corresponding to the total number, when the total number is 1, is used for obtaining one Precoding Matrix or the PMIs corresponding to the total number, when the total number is greater than 1, are used for jointly obtaining one Precoding Matrix, the total number is an integral.

2. The method according to claim 1, wherein the step of the user equipment determining a total number of PMI required to be fed back to a base station according to the v and comprises:

when v is greater than or equal to N0, the user equipment determining that the total number of the PMI required to be fed back to the base station is m; and when v is less than N0, the user equipment determining that the total number of PMI required to be fed back to the base station is m+1;

wherein N0 is an integral number greater than 0 and less than or equal to 8, and m is an integral number determined according to a level of feedback precision of the user equipment.

3. The method according to claim 2, wherein the step of the user equipment determining the total number of PMI required to be fed back to a base station according to the v further comprises:

when v is less than N1, the user equipment determining that the total number of the PMI required to be fed back to the base station is m+2;

wherein N1 is an integral number less than N0 and greater than 0.

4. The method according to claim 1, wherein
the PMI corresponding to the total number comprises at least first Precoding Matrix Indicator (PMI1).

5. The method according to claim 4, wherein the step of the base station acquiring the channel information of said subband according to the PMI corresponding to the total number and the RI comprises:
when the total number of PMI is 1, the base station seeking out a code word W1 from a first codebook according to the PMI1 and RI, and acquiring the channel information of said subband according to the code word W1 and a function F(W1, W2, . . . , Wn) of n−1 matrixes, or the base station representing the code word W1 as the channel information of said subband, wherein said n−1 matrixes are convention values, and n is an integral number; or the base station directly acquiring the channel information of said subband according to the code word W1; and
when the total number of PMI is r, the base station seeking out the code word W1 from the first codebook according to the PMI1 and the RI, and seeking out r−1 matrixes corresponding to other r−1 PMIs from codebooks corresponding to said other r−1 PMIs except the PMI1, acquiring the channel information of said subband according to said code word W1 and the function F(W1, W2, . . . , Wn) of said n−1 matrixes comprising said r−1 matrixes, wherein other n-r matrixes except said r−1 matrixes in said n−1 matrixes are convention values; or the base station acquiring the channel information of said subband according to the code word W1 and a function f(W1, W2, . . . , Wr) of said r−1 matrixes, wherein r is an integral number greater than or equal to 2.

6. The method according to claim 5, wherein
said convention values are fixed vectors or matrixes, or are different convention values according to the $v$ of said current channel; wherein $v$ represents the rank of channel represented by said RI.

7. The method according to claim 5, wherein
when r is equal to 2, a function F(W1, W2) comprises W1 ×W2 or W2⊗W1; and
when r is equal to 3, a function F(W1, W2, W3) comprises (W3' * W3) ×W1 ×W2 or W2⊗(W3' ×W3 ×W1), wherein W3' denotes a conjugate transpose matrix of W3.

8. A device for acquiring channel information, comprising:
a receiving module, which is configured to receive Precoding Matrix Indicator (PMI) corresponding to a total number of PMI transmitted by a user equipment and Rank Indicator (RI) of a current channel; and
an acquiring module, which is configured to acquire channel information of a subband according to the PMI corresponding to the total number and the RI received by said receiving module;
wherein the total number of the PMI is determined by the user equipment according to a rank $v$ of the current channel, the PMI corresponding to the total number, when the total number is 1 is used for obtaining one Precoding Matrix or the PMIs corresponding to the total number, when the total number is greater than 1, are used for jointly obtaining one Precoding Matrix, the total number is an integral, and $v$ is indicated in said RI and $v$ is a positive integral number not greater than 8.

9. The device according to claim 8, wherein
the PMI corresponding to the total number comprises at least first Precoding Matrix Indicator (PMI1);
said acquiring module is configured to acquire the channel information of the subband by a following method:
when the total number of PMI is 1, seeking out a code word W1 from a first codebook according to PMI1 and RI; and
acquiring the channel information of said subband according to the code word W1 and a function F(W1, W2, . . . , Wn) of n−1 matrixes, or representing the code word W1 as the channel information of said subband; wherein said n−1 matrixes are convention values, and n is an integral number; or acquiring the channel information of said subband according to the code word W1.

10. The device according to claim 8, wherein
the PMI corresponding to the total number comprises at least first Precoding Matrix Indicator (PMI1);
said acquiring module is configured to acquire the channel information of the subband by a following method:
when the total number of PMI is r, seeking out a code word W1 from a first codebook according to PMI1 and RI, and seeking out r−1 matrixes corresponding to other r−1 PMIs from codebooks corresponding to said other r−1 PMIs except the PMI1; and
acquiring the channel information of said subband according to the code word W1 and a function F(W1, W2, . . . , Wn) of n−1 matrixes comprising said r−1 matrixes, wherein other n-r matrixes except said r−1 matrixes in said n−1 matrixes are convention values; or acquiring the channel information of said subband according to the code word W1 and a function f(W1, W2, . . . , Wr) of said r−1 matrixes, wherein r is an integral number greater than or equal to 2.

* * * * *